UNITED STATES PATENT OFFICE.

RICHARD AUSCHÜTZ, OF BONN, ASSIGNOR TO THE ACTIEN-GESELLSCHAFT FÜR ANILIN FABRIKATION, OF BERLIN, GERMANY.

PROCESS OF OBTAINING CHLOROFORM.

SPECIFICATION forming part of Letters Patent No. 535,270, dated March 5, 1895.

Application filed July 27, 1894. Serial No. 518,729. (No specimens.) Patented in Germany April 14, 1894, No. 70,614.

*To all whom it may concern:*

Be it known that I, RICHARD AUSCHÜTZ, professor of chemistry, of Bonn-on-the-Rhine, in the Kingdom of Prussia, German Empire, have invented new and useful Improvements in the Production of Pure Chloroform; and I do hereby declare that the following is a full, clear, and exact description of the invention, which will enable others skilled in the art to which it appertains to make and use the same.

This invention relates to the production of chemically pure chloroform from double compounds which this substance forms with certain products belonging to the aromatic series, and for which I have received German Letters Patent No. 70,614, dated April 14, 1894.

I have discovered that chloroform enters into combination with certain new lactid like condensation products, also discovered by me of ortho-phenolcarbonic acids, forming in this way new chemical double compounds which are distinguished by their tendency to crystallize. The constitution of these double compounds corresponds to the general formula [R+2(CHCl$_3$)] R signifying one molecule of the aforementioned aromatic compounds. Now I have discovered that in these double-compounds the chloroform is only loosely united with the other component, in a manner analogous to that in which water of crystallization for instance is united with salts. As by heating the water of crystallization of salts can be driven out, so in like manner the new chloroform-double compounds can be decomposed by the action of heat into their component parts. In preparing these double compounds by means of ordinary chloroform the impurities which it always contains, do not and can not enter into the crystallized double compound which therefore contains absolutely pure chloroform, and consequently the chloroform obtained by decomposition of these double compounds must also be chemically pure. By the use of such chemically pure chloroform for medical purposes all the inconveniences which occur in consequence of the use of chloroform containing impurities are avoided.

On the fact, that the aforementioned double-compounds contain a large percentage of chloroform—for instance the double-compound of chloroform and salicylid contains 33.24 per cent.—I have based the process for the manufacture of pure chloroform which forms the subject of this invention.

The lactid like condensation products which I employ are generally prepared by heating ortho-phenol carbonic acids with phosphorus oxychloride in the presence of suitable dissolving agents, as for instance toluene, xylene and the like. These products and their preparation have been described in *Justus Liebig's Annalen der Chemie*, tome 273, at pages 73, 94 and 97, and in the German Patents Nos. 68,960, 69,708, 70,158 and 70,614, granted to the Actien-Gesellschaft für Anilin Fabrikation, of Berlin, Germany. (Compare also *Journal of the Society for Chemical Industrie*, 1893, page 782.) The typical representative of these new substances is the product derived from salicylic acid, which I have denominated "salicylid." It possesses the following constitution:

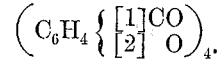

When boiled with chloroform it enters into solution and, on cooling, the double compound "salicylid-chloroform"

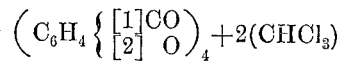

separates in the form of splendid translucent crystals. I shall now describe the preparation of pure chloroform by means of the aforementioned typical double compound. The double compound "salicylid-chloroform" is heated in a suitable closed vessel which is provided with a cooler leading to an apparatus for the condensation of the escaping chloroform. The vessel is heated in an oil bath or a water bath until the salicylid-chloroform is entirely decomposed and all the chloroform is driven out and condensed.

In the vessel there remains a white residue consisting of salicylid, which may again be transformed into its chloroform double compound and used for the production of another portion of pure chloroform. I may in this way with a small quantity of salicylid or an equivalent compound purify large quantities of crude chloroform and transform it into a chemically pure product.

Having thus described the nature of my invention and the best means I know for carrying the same into practical effect, I claim—

1. The herein described process for the manufacture of chemically pure chloroform by decomposing by heat double compounds of chloroform and lactid like condensation products derived from ortho-phenol carbonic acids and distilling off and condensing the pure chloroform thus driven off.

2. The herein described mode of producing chemically pure chloroform which consists in separating the chemically pure chloroform from its impurities by combining the same with salicylid and then decomposing the double compound, salicylid-chloroform and freeing the chemically pure chloroform, substantially as set forth.

3. The method of producing chemically pure chloroform which consists in forming double compounds of chloroform and products derived from orthophenol carbonic acids, and then decomposing the double compound and liberating the chemically pure chloroform, as set forth.

In testimony whereof I hereunto set my hand and affix my seal in the presence of two witnesses.

RICHARD AUSCHÜTZ. [L. S.]

Witnesses:
CARL BODENRZ,
SOPHIE NAGEL.